L. C. STUKENBORG.
COTTON PICKER SUCTION NOZZLE.
APPLICATION FILED APR. 14, 1919.
1,426,326.
Patented Aug. 15, 1922.
2 SHEETS—SHEET 1.
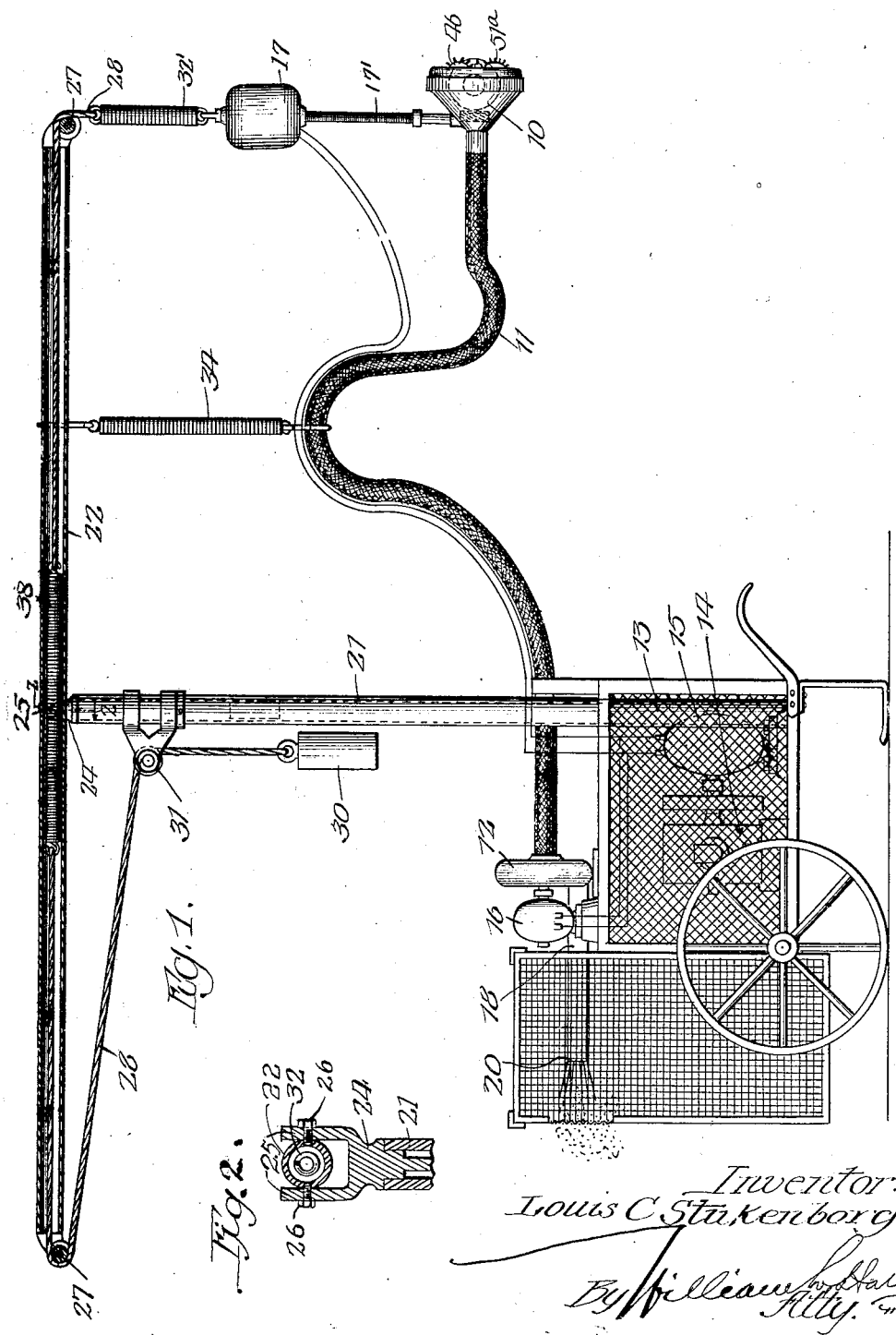
Inventor:
Louis C. Stukenborg.
By William ... Atty.

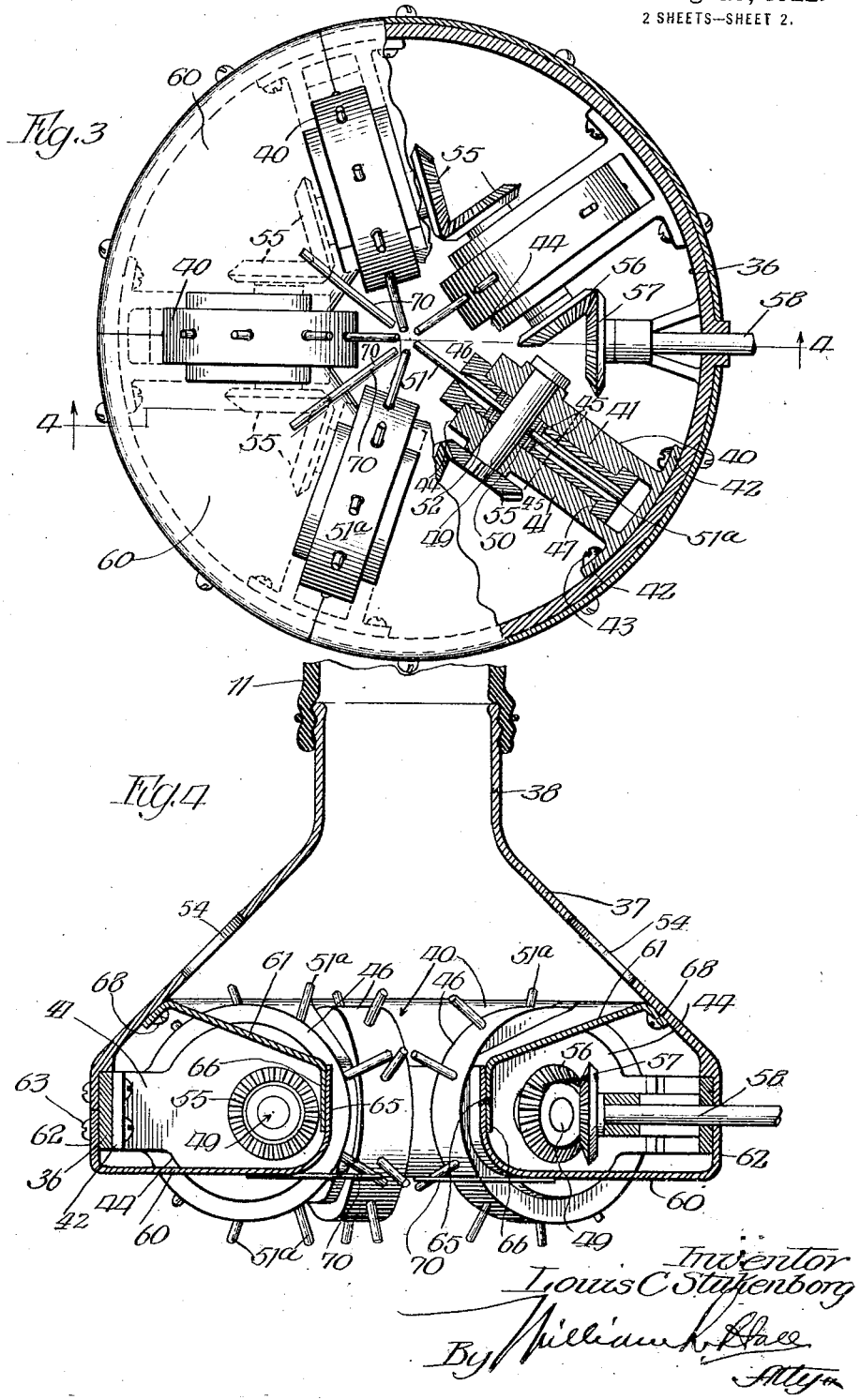

UNITED STATES PATENT OFFICE.

LOUIS CARROLL STUKENBORG, OF CHICAGO, ILLINOIS, ASSIGNOR TO FREDERICK W. STUKENBORG, OF CHICAGO, ILLINOIS.

COTTON-PICKER SUCTION NOZZLE.

1,426,326.  Specification of Letters Patent.  Patented Aug. 15, 1922.

Application filed April 14, 1919. Serial No. 290,031.

*To all whom it may concern:*

Be it known that I, LOUIS CARROLL STUKENBORG, a citizen of the United States, and a resident of Chicago, in the county of Cook and State of Illinois, have invented certain new and useful Improvements in Cotton-Picker Suction Nozzles; and I do hereby declare that the following is a full, clear, and exact description thereof, reference being had to the accompanying drawings, and to the characters of reference marked thereon, which form a part of this specification.

This invention relates to improvements in cotton picking and handling machines adapted for picking cotton from the plant bolls in a manner to substantially separate the cotton staple from the burs and larger leaf particles of the plant and also adapted to picking or segregating cotton staple from other sources of supply, as from a bale at a ginning or other cotton working machine.

The purpose of the invention is to provide a novel picking mechanism of the character set forth embracing means which directly engage the cotton to positively remove the cotton, combined with suction means in rear thereof for removing the cotton backwardly from the positive picking means and carry it by the aid of a suction device to a place of disposal. The picking device shown in the present application is applicable for use where a marked cleanliness of the picked cotton is not a factor sought, when picking from the plant, but which effectively removes the cotton from the plant and backwardly by suction to a place of disposal, by means, however, which eliminate a very large percentage of the particles of burs and leaves which are found in the product picked by what is known as suction pickers. It may be understood further that the device is capable of handling cotton from other sources than the natural plant, for instance, for removing cotton staple from seed cotton bales or from ginned cotton bales. The terms "picking" is, therefore, not intended to be limiting in the sense of removing cotton from the natural plant.

As shown in the drawings,

Figure 1 is a side elevation of a cotton picking machine embodying my invention.

Figure 2 is a sectional detail on the line 2—2 of Figure 1.

Figure 3 is an end elevation, with parts broken away, of the picking head.

Figure 4 is a section on the line 4—4 of Figure 3.

As shown in the drawings, 10 designates the picker head. It is connected to the free end of a flexible conveyor tube 11, the rear end of which tube is connected to a suction blower 12 of any approved type. As herein shown, said suction blower is supported on a frame 13 which may be supported on wheels or otherwise, and constitutes a carrier for a motor 14, as a gasoline engine, by which to operate the various elements of the picker. A dynamo or generator 15 is operated by the engine 14 and is connected to motors 16 and 17 that respectively drive the exhaust blower 12 and the mechanism of the picker head 10. The exhaust pipe 18 of said blower 12 discharges cotton backwardly into a receptacle 20 of any suitable type carried by the frame.

The weight of the head, conveyor tube and motor 17 are supported from the frame 13 by counterbalancing means made as follows:

21 designates a hollow standard which rises from the frame, and 22 designates a horizontal beam that is adapted to swing horizontally about the axis of the standard 21 and to also swing vertically in a plane parallel to said axis. As herein shown a turntable 24 is seated on the upper end of the standard to rotate relatively thereto and is provided with upstanding arms 25, between which the beam 22 is located and upon which it is supported through the medium of bearing screws 26. Thereby the beam 22 may be freely swung in a substantially universal manner relatively to the standard 21.

Said beam 22 is hollow and is open at both ends. It is provided at said open ends with pulleys 27 about which are trained a flexible strand 28 that extends horizontally through said beam. The strand carries at one end a counterweight 30, the strand being trained between the counterweight and the rear pulley 27 over a guide pulley 31 supported on the standard 21. Said cable 28 is provided between the picker head 10 and the counterweight 30 with one or more springs 32, 32' so as to yieldingly sustain the picker head relatively to the counterweight; the said strand thus constituting in effect a yieldable strand. In the present construction one of the springs may be contained within the tubular beam 22 and the other of said springs may be disposed in the cable adjacent to the picker head, and as shown, the motor 17 is included in said yieldable strand, being located between the spring 32' and the head. The motor 17 is connected to the picker mechanism of the head through a flexible driven shaft, 17', and suitable speed reducing gears, as hereinafter described. The intermediate portion of the conveyor tube 11 may be supported from the beam 22 through the medium of a spring or resilient hanger 34.

Referring to the details of the picker head mechanism for withdrawing the cotton from the plant or from a cotton bale and carrying the cotton rearwardly, it may be premised that the picker mechanism embraces a plurality of sets of revolvable picker fingers that are arranged to rotate within the mouth or like circumscribed area of the picker head, and in planes radial to longitudinal axis of the head, said fingers cooperating with stripper means so constructed and arranged that the fingers are extended for contact with the cotton at the center of the head on the front or picking side thereof, so as to remove the cotton from the plant, a bale, or the like, and are retracted into the stripper means as the fingers recede from the center towards the rear of the head to strip cotton from the fingers and to deliver the cotton into the sphere of influence of the column of conveying air movable rearwardly through the tube 11.

As shown in Figures 3 and 4, the head, designated as a whole by 10, embraces an enclosing ring 36 which constitutes a support or spreader for a flaring frame 37 that terminates rearwardly in a neck 38 to which the conveying tube 11 is connected. Said ring circumscribes the picker head mouth. Within said ring is located a plurality of picker units, each designated as a whole by 40. They are radially disposed to each other and to the axis of the head. A description of one of said units will answer for the others.

Each unit comprises a frame consisting of fixed parallel members 41, 41, which are directed radially from the ring 36 toward the center of the head. They are formed with flanges 42 that are fixed, as by means of screws or rivets 43, to the inner side of said ring. Said arms are formed with cylindric bearings 44 that are concentric to an axis indicated by the dotted line 45 in Figure 3. 46 designates a shell that is provided on its outer sides with annular internal bearing 47 that surround the bearings 44 of the arms 41. 49 designates a shaft that is rotatively mounted in thickened bearings of the arms 41, 41 and is disposed eccentric to the axis of the shell 46 and of the annular bearings 44, and, therefore, eccentric to the dotted line 45. 50 designates a bushing fixed to said shaft 49 between the arms 41. 51, 51$^a$ designate picker pins or fingers, the latter of which are hinged at their inner ends to rods 52 which extend through the bushing 50 parallel to the axis of the latter. The pin 51, of which there is one for each set of fingers, interlocks at its end to the shaft 49 and constitutes a driving pin by which the shell 46 is rotated from the sleeve or bushing 50. Said pins or fingers extend outwardly from said bushing and through openings in the periphery of the shell 46 and therebeyond variable radial distances as determined by the relative eccentricity of the shaft 49 and the bearing 44. The driving pin 51 constitutes means whereby power delivered through the shaft 49 acts to rotate the shell 46 on its bearing 44, eccentric to the shaft 49, so that said picker fingers or pins will be projected from the shell on the side thereof toward the center of the head, as indicated in Figures 3 and 4, said pins retreating into said shell as the latter turn rearwardly from said center. Therefore, when the head is presented to a boll or to a bale of cotton the pins are extended from the shells as they approach the center of the head so as to grasp the cotton fiber and to carry it backwardly between the radially assembled units, and as said shells revolve backwardly from the front of the head the pins or fingers disappear into the shell and thereby strip the cotton therefrom and deliver the fiber freely into the influence of the rearwardly moving column of air induced through the tube by the blower 12, and which may be drawn into the head backwardly over the picker units or partially through openings 54 in the casing 37. The cotton may be delivered by said air column into the receiving basket 20 and against the screened wall thereof to thereby permit the dirt to be blown from the cotton.

The picker fingers of the several units referred to are operated simultaneously through appropriate driving connections to and between the shafts 49. Said shafts may be connected for operation in any suitable manner. As herein shown, they are provided at their ends with meshing beveled gears 55, 56, the beveled gear 56 at one end of the series meshing with a beveled gear 57 that is fixed to and rotated by a shaft 58 driven from the motor 17 by any suitable speed reducing gears.

In order to avoid the cotton finding its way to and clogging the gears 55, 56 and 57, there are provided front and rear shields 60, 61, preferably made of sheet metal, and of general triangular shape to fit between the radial take-off units. The outer edge of each of said shields 60 is formed with a rearwardly turned flange 62 to overlap the ring 36 and may be attached thereto by the screws 63. Said shields 60 are provided at their inner ends with rearwardly turned flanges 65 that overlap flanges 66 that are directed outwardly from the inner ends of the shields 61 which latter are, by the screws 68, attached to the flaring casing 37 of the head. The shields 60, 61 described permit free access of the pins or fingers 51, 51ª to the cotton while preventing access of the cotton exterior to the central area of the head at which the cotton is drawn into the head, and which also prevents, as before stated, entanglement of the cotton with the intermeshing gear 55, 56, 57.

If desired and preferably, guards 70 are associated with the fingers 51, 51ª at the center of the head to prevent pulling into the head the burs and large fragments of the plant leaves. These guards may be made of wire and may be soldered or otherwise attached to the inner, narrower portions of the triangular shields 60 of the head, as indicated most clearly in Figures 3 and 4.

The mechanism shown in respect of the manner of drawing the cotton into the head and for driving the cotton picking fingers may be otherwise adapted than as herein shown. The radial relation of the units, however, embracing the hollow shells which rotate with said picking fingers and the fixed bearings on which said shells rotate in eccentric relation to the axes of rotation of the fingers, is a desirable arrangement and is hereinafter made the subject of specific claims.

I claim as my invention:

1. A cotton picking and conveying device comprising, in combination with a suction tube, a picker nozzle having a receiving mouth provided with a series of rotative picker elements disposed radially about the axis of said nozzle, driving gears for the picker elements, and casings enclosing said gears.

2. A picker nozzle having a receiving mouth, a plurality of series of picker fingers in said mouth rotative on axes disposed at angles to each other and front and rear substantially triangular shield members connected at their bases to the nozzle and terminating short of the center of the nozzle.

3. A picker nozzle having a receiving mouth, a plurality of series of picker fingers in said mouth rotative on axes disposed at oblique angles to each other, with movable stripper means to strip the cotton from said fingers, operating and connecting gears connected to and between said picker fingers and stripper means, and a driving shaft connected to one of said gears.

4. A picker nozzle having a receiving mouth, a plurality of series of angularly spaced picker fingers operating in said mouth and rotative on axes disposed at oblique angles to each other, stripper means to strip the cotton from said fingers, interconnecting driving means for said fingers and stripper means, and shields for enclosing said driving connections.

5. A picker nozzle having a receiving mouth, a plurality of series of angularly spaced picker fingers operating in said mouth and rotative on axes disposed at angles to each other, stripper means to strip the cotton from said fingers, interconnecting driving means for said fingers and stripper means, and inner and outer substantially triangular shields between adjacent series of picker fingers to enclose said driving connections.

6. A cotton picking and conveying device comprising a nozzle having a receiving mouth and a series of angularly spaced picker units disposed within said mouth radially to the center thereof, each unit comprising a rotative casing formed with peripheral openings, a series of picker fingers adapted to extend through said openings, and rotative on an axis eccentric to the axis of said casing, means to drive said units, operating gears connected to and between said series of picker fingers.

7. A cotton picking and conveying device comprising a nozzle having a receiving mouth and a series of angularly spaced picker units disposed within said mouth radially to the center thereof, each unit comprising a rotative casing formed with peripheral openings, a series of picker fingers adapted to extend through said openings, and rotative on an axis eccentric to the axis of said casing, means to drive said units, and guards extending radially towards the center of said mouth over the operative position of said fingers.

8. A cotton picking and conveying device comprising a nozzle having a receiving mouth, a plurality of pairs of radial arms attached to the nozzle and extending inwardly toward the center thereof, each pair formed with annular bearings, casings between said arms and rotative on said bearings, and provided with openings, shafts extending through said arms and said casings, eccentrically to the latter, a series of pins associated with each shaft, one of each series constituting a driving pin and the other loosely connected to said shaft, said pins extending through said openings in the casing and adapted to be projected from the casing at the center of the nozzle.

9. A picker nozzle having a receiving mouth, a plurality of series of picker fingers in said mouth rotative on axes disposed at angles to each other, with stripper means to strip the cotton from said fingers, and guards fixed to the structure and extending radially towards the center of the mouth.

10. A picker nozzle having a receiving mouth, a plurality of series of angularly spaced picker fingers operating in said mouth and rotative on axes disposed at angles to each other, stripper means to strip the cotton from said fingers, interconnecting driving means for said fingers and stripper means, shields for enclosing said driving connections, and guards fixed to said shields and extending radially towards the center of the mouth.

11. A picker nozzle having a receiving mouth, a plurality of series of angularly spaced picker fingers operating in said mouth and rotative on axes disposed at angles to each other, stripper means to strip the cotton from said fingers, interconnecting driving means for said fingers and stripper means, and supports for said picker fingers and stripper means attached to the structure and extending radially toward the center of the mouth.

12. A picker nozzle having a receiving mouth and provided with a rearwardly tapered portion forming a neck for connection to a suction tube, a series of rotative picker elements within and rotative in planes radial to the axis of said mouth, and means located in position in the nozzle for doffing the cotton from the picker elements.

In testimony whereof I claim the foregoing as my invention, I hereunto append my signature at Chicago, Illinois, this 11th day of April, 1919.

LOUIS CARROLL STUKENBORG.